Sept. 4, 1956      W. E. MARTIN      2,761,699

TRAILER HITCH PIN STRUCTURE

Filed April 11, 1951

INVENTOR.
William E. Martin
BY
Eberhard E. Wittler
Atty.

United States Patent Office
2,761,699
Patented Sept. 4, 1956

2,761,699

TRAILER HITCH PIN STRUCTURE

William E. Martin, Kewanee, Ill.

Application April 11, 1951, Serial No. 220,388

5 Claims. (Cl. 280—433)

This invention relates to the hitch pin structure for trailing vehicles.

More specifically, this invention has to do with a hitch pin structure designed for the hitch tongue of a foldable gooseneck trailer.

Experience has proven that a fixed hitch pin structure designed for cooperative use with a fifth wheel of a pulling vehicle is not the most feasible design in any type of trailing vehicle wherein the hitch unit carrying the pin is lowered and brought into contact with the surface supporting the trailer. In this connection, a fixed pin has also been found undesirable for use in connection with a hitch tongue of a foldable trailer gooseneck wherein the tongue itself comprises a loading ramp over which vehicles may pass that are to be transported upon the trailer.

In trailing vehicles carrying foldable gooseneck structures with the hitch tongue carrying a fixed pin, some of the objections found in the use of such a pin are that the projecting pin strikes the ground or supporting surface when the gooseneck is lowered whereby the pin is subjected to damage and disfiguration, and one of the other main objections is that in many of these structures the hitch tongue is actually rockably and unstably supported upon the pin itself instead of obtaining the full support of the entire width of the tongue carrying the pin. Added to these two objections, is the fact that the pin is normally well greased by reason of its usual connection with a grease filled coupling of a fifth wheel, and when the pin is brought into contact with the ground or surface supporting the trailer, the pin will be forced into the ground where the surface is soft, particularly under load conditions when vehicles are crossing the tongue when the latter comprises a ramp for loading the trailer. By driving the pin into the ground, considerable dirt, sand and other grit will be carried by the pin and in the annular recess thereof to the working parts of the fifth wheel of the tractor, which creates considerable wear to the coupled working parts of a tractor trailer setup.

It is one of the main objects of the present invention to provide a hitch pin structure wherein the pin itself is supported for movement relative to the hitch tongue.

It is another object of the present invention to provide a hitch pin which is relatively movable to the trailer hitch tongue in a direction generally vertical to the ground.

Another object of the present invention is to provide a pin of this character wherein a part of the pin will be visible to the tractor operator in the event that the fifth wheel coupling with such a pin has not been properly made.

It is a further object of this invention to provide a hitch pin of sufficient body and weight which will normally keep this pin seated relative to the tongue parts and in operative position for latching with the fifth wheel of a tractor during the coupling operation of the vehicles.

A still further object of this invention is to provide a hitch pin of this character which is relatively movable with respect to its hitch tongue, and wherein spring means are employed to normally maintain the pin in a predetermined position with respect to the tongue supporting the same and in a position which is the normal latching location of the pin as the same is approached by the fifth wheel of a tractor.

All other objects and advantages relating to the trailer hitch pin structure of the present invention shall hereinafter appear in the following detailed description having reference to the accompanying drawings forming a part of this specification.

Figure 3:
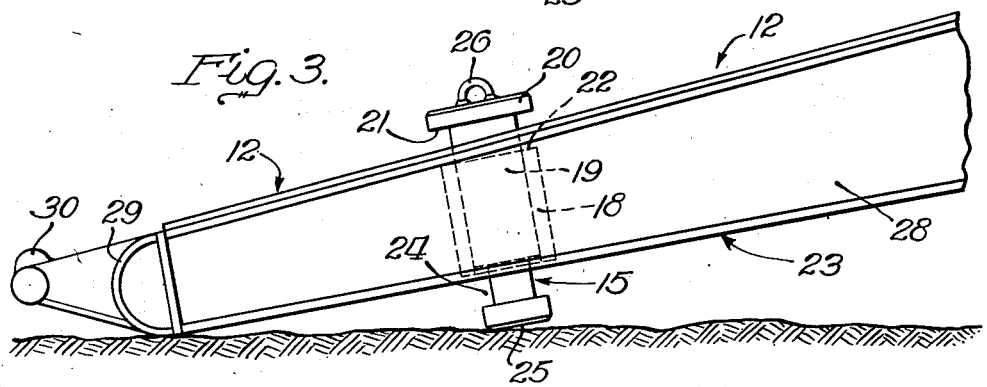
Figure 4:
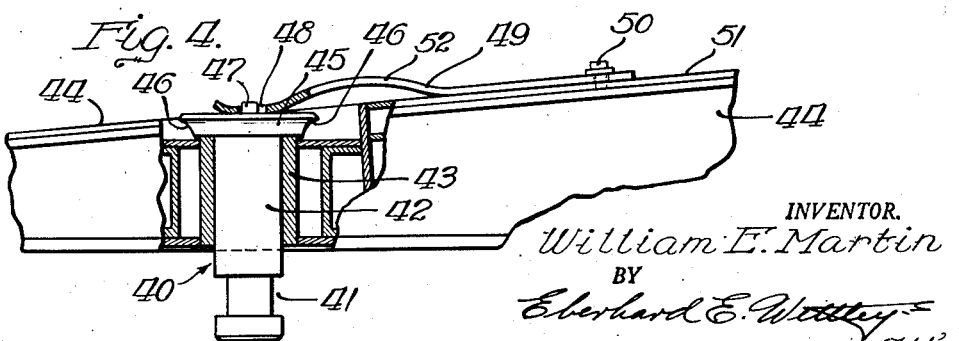

Fig. 3 is a side elevational view of the fragmentary portion of the tongue of the gooseneck structure incorporating the hitch pin of this invention and illustrating what occurs when the tongue is lowered to the ground in a position for loading or unloading the trailer bed of the trailer; and Fig. 4 is a modified arrangement fragmentarily showing a portion of the hitch tongue of the trailer using a slightly different pin construction in combination with spring means for maintaining the pin in its normal operative latching position with respect to the tongue.

Figure 1:
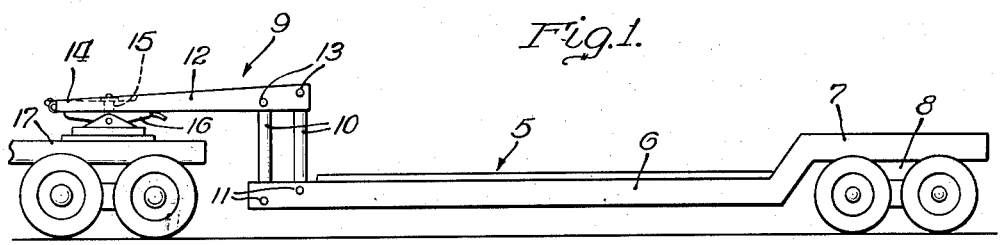
Fig. 1 is a general side elevational view of a trailer provided with a foldable gooseneck hitch structure incorporating the hitch pin of the present invention.

Referring to Fig. 1, a conventional trailer 5 is illustrated having a carrying bed 6, on offset rear deck 7, a wheel tandem axle 8, and a foldable gooseneck arrangement 9 carried by the bed 6. This particular trailer uses a parallel link structure 10 suitably pivoted to the bed at 11 and to a hitch tongue 12 at 13, whereby the hitch tongue 12 may be lowered to the ground with the front end of the bed 6 supported on suitable blocks or hydraulic feet or by which the same tongue may be brought flat into contact with the ground with the front end of the bed 6 also lowered to the ground.

The hitch pin structure of the present invention is associated with the forward end 14 of the tongue 12 and comprises a vertically movable hitch pin 15 that is carried in a prepositioned manner with respect to the tongue 12 for operative latching contact with a fifth wheel structure 16 carried upon the rear end of a tractor 17 which comprises the pulling vehicle for the trailer 5.

Figure 2:
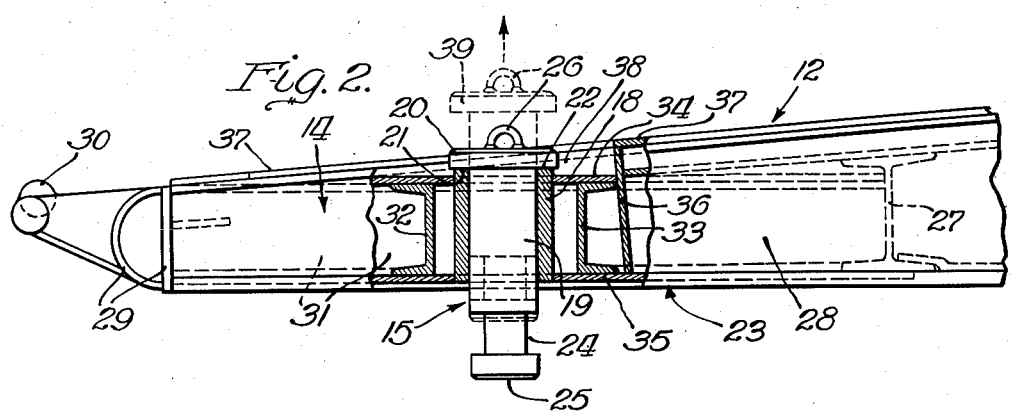
Fig. 2 is an enlarged detail view of the forward portion of the trailer tongue partially broken away and in section to show the combination of elements of the tongue and the hitch pin of the present invention.

The tongue 12 as here shown comprises a structure which functions as a loading ramp for the trailer 5, although this tongue may be the hitch means of any foldable gooseneck arrangement which must be lowered to the ground in order to provide the necessary clearance for approaching the forward end of the trailer bed 6. Such hitch structures as the tongue 12 may be made with any number of arrangements of composite beams and plates, but preferably an arrangement as illustrated in Fig. 2 may be used to carry out the purposes of this invention. As seen in Fig. 2, therefore, the pin 15 is slidably carried within a sleeve 18 which has an internal diameter slightly larger than the body 19 of the pin to permit free movement of the pin relative to the sleeve. The upper end of the pin is provided with a head 20 which is larger than the body 19 of the pin so as to present an annular shoulder 21 which will rest upon the upper end 22 of the sleeve 18, thus providing a vertical limit for the pin as the latter is dropped into the sleeve 18. The lower end of the pin 15 projects beyond the lower face 23 of the tongue 12 and contains an annular recess 24 near the bottom end 25 of the pin, which recess 24 has been designed and positioned for coactively joining with the latching parts of the fifth wheel 16 as the tractor 17 is backed underneath the tongue 12. In addition, the head 20 is also provided with a ring 26 that may be used to manually withdraw the pin 15 for inspection or for other desirable reasons.

As best shown in Fig. 2, the tongue 12 is usually constructed with a plurality of longitudinal and transverse beams which are welded together and joined to a perimeter framework. One of the transverse beams is indicated at 27, one of the side tapered channels of the perimeter framework at 28, and the forward end of the tongue terminates with a cross guard 29 supplied with a cable hitching bar 30 by means of which the forward end of the foldable gooseneck structure 9 may be raised and lowered. A pair of centrally located channels 31 are connected between the transverse beam 27 and the guard structure 29, and transverse channels 32 and 33 connect between the two longitudinal channels 31, the entire structure being secured by welding or other suitable fastening means. The channels 31, 32 and 33 are capped with an upper plate 34 and sealed at the bottom with a lower plate 35. Normally, both plates extend from the front guard 29 to the end of the channel 33, the bottom plate 35 extending as far back as the cross beam 27. A generally vertical gusset or baffle 36 is welded to the lower plate 35 and to the upper plate 34 and extends upwardly to meet the surface plate 37 which covers the main upper surface of the tongue 12.

The sleeve 18 is welded into appropriate openings in plates 34 and 35 in a position intermediate the cross channels 32 and 33 and between the longitudinal channels 31 which flank the pin in the longitudinal direction of the trailer. With this arrangement of the cross channels 32 and 33, together with the longitudinal channels 31, all supported by the other associated framework of the forward end of the tongue, the sleeve 18 is rigidly maintained in the position shown for adequately supporting the pin 15 within the tongue structure to function as the pivot pin that latches with the fifth wheel of a tractor.

It should also be noted that the vertical distance between the bottom of the tongue 23 and the top of the plate 34 is less than the thickness of the tongue at the pin location, so that a recess such as 38 is formed in the upper portion of the forward end of the tongue, thereby substantially nesting the upper end of the pin comprising the head into a flush position with respect to the top plate 37 of the tongue with the ring 26 in a position to be lifted manually by hand or through the use of a suitable bar which can be inserted through the ring.

As shown in dotted lines in Fig. 2, the pin may be withdrawn upwardly out of the sleeve 18 for removal for inspection or for replacement if necessary. This easy removal and replacement of the pin 15 is a considerable advantage in tongue structures of this type wherein it would entail considerable work to replace a fixed pin, which may have been damaged, with a new pin of like construction, particularly when such pins are welded to the framework of the tongue. The dotted line position 39 also depicts generally how this pin might appear if an improper union has been effected between the fifth wheel and the pin, which may occur through misalignment of the vehicles and under certain conditions of operation. If the latch has not been properly effected, the pin will rise into the dotted line position and the operator can immediately observe that he has not properly hooked on to the trailing vehicle and, therefore, will not release his cable support of the front end of the tongue 12 until he again pulls away with his tractor to let the pin drop into place as shown in full lines in Fig. 2, subsequently backing up his tractor to make the proper coupling with the fifth wheel and the pin.

As seen in Fig. 3, the tongue 12 is shown as angularly disposed with respect to the ground, but resting upon the ground for the purpose of loading the trailer over the tongue. The inclination of the tongue occurs when the forward end of the trailer bed 6 is supported upon jacks, blocks or other means, and in this case the end 25 of the pin 15 will naturally abut the ground as the tongue lowers, slidably raising the pin body 19 relatively to the sleeve 18 that is carried in the tongue so that the pin and tongue occupy the relative positions somewhat as indicated in Fig. 3. On other occasions, when the forward end of the bed 6 is also lowered to the ground, the tongue 12 will be moved relatively to the bed upon the parallel links 10 into position generally flat and parallel to the ground under which conditions the pin 15 will move upwardly with the bottom face 25 thereof substantially flush with the under surface 23 of the tongue 12. In this respect, the pin will always be self adjusting and will never gouge or dig into the supporting surface or form the supporting surface upon which the forward end of the tongue 12 will rock under load conditions, which is obviously undesirable at all times.

Fig. 4 illustrates a similar pin 40 having a recess 41 for latching engagement with the fifth wheel of a tractor, and having a body 42 that is vertically slidable within the sleeve 43 supported in the tongue 44 here shown. In this construction, the head 45 is provided with an annular undercut surface 46 which will permit adequate hand gripping means to remove the pin, and which also provides a flange under which the end of a crow bar may be inserted for loosening the pin, if necessary, as may happen when the pin might become frozen to the sleeve 43 under ice conditions.

The head 45 is also provided with a central knob 47 which extends through an opening 48 in a generally flat leaf spring 49 that is pivotally carried at 50 to the top plate 51 and to the associated structure of the tongue 44. The leaf spring 49 is bowed as at 52 to provide sufficient clearance as the pin 40 raises to prevent the forward end opening 48 of the leaf spring from leaving the knob 47. The spring 49 may be raised and swung laterally about its pivot 50 to free the pin 40 entirely for removal or inspection, and under normal operating conditions, the spring 49 can be longitudinally aligned to bring the opening 48 into receiving position for the knob 47 of the pin 40.

With the latter construction, the head 45 of the pin 40 will at all times be seated upon the upper end of sleeve 43 to normally hold the recess 41 in the depending position shown in Fig. 4 for accurate insertion into the fifth wheel structure of a tractor.

The constructions shown and described are given by way of preferred examples of the combination of elements used in carrying out the fundamental concept of this invention. Certain changes and modifications are contemplated without departure from the present invention, and such changes and modifications shall be governed by the breadth and scope of the appended claims.

What I claim is:

1. A hitch structure for a vehicle comprising a tongue, a hollow support carried by said tongue between the top and bottom surface portions thereof and within the confines of said tongue, and a hitch pin for said tongue comprising a body having a latching end for connection with another vehicle, said body being loosely and freely guided within said hollow support and being of a length so as to extend through said tongue whereby said support provides protective means within said tongue to normally hold said pin body therein with the latching end projecting outwardly from said support and tongue, and shouldered means on said body arranged to normally seat upon said support to preposition said pin relatively to the support and the tongue, said shouldered means normally occupying a position above the top surface portion of said tongue, and finger grip means connected with said pin to facilitate instant partial or complete bodily withdrawal of said pin with respect to said hollow support and in relation to the tongue.

2. A hitch structure for a vehicle comprising an enclosed tongue, a hollow support carried by said tongue and within the confines thereof, and a hitch pin for said tongue comprising a body having a latching end for connection with another vehicle, said body being loosely and freely carried within said hollow support and arranged to extend through said tongue whereby said support provides protective means within said tongue to normally hold said pin body therein with the latching end projecting outwardly from said support and tongue, and shouldered means on said body comprising an annular head to normally rest upon said support as a sealing closure means to prevent infiltration of dirt and to preposition said pin relatively to the support and the tongue with the latching end of the pin disposed in operative position, and said hitch pin body and its latching end together comprising a solid structure of such predetermined weight as to overcome all frictional resistance of said hollow support whereby said pin per se maintains said annular head in sealing contact with said support and with the latching end of said body disposed in extended operative position beneath said tongue and said support under all normal conditions of operation.

3. In a folding gooseneck of a trailer, the combination of an enclosed hitch tongue, a hitch pin for said tongue, a hollow supporting member positioned within said tongue and through the thickness thereof, to loosely and gravitationally receive said pin therein, said hollow supporting member providing a guide path for said pin through the confines of the vertical thickness of the tongue from the top to the bottom thereof, and coacting means carried by said pin and supporting member respectively to normally position said pin in a predetermined vertical relation within the tongue and with respect to said member and to project from the latter for fifth wheel attachment, one of said coacting means comprising an integral portion of said pin constructed and arranged to be visibly situated above the upper surface of said enclosed tongue, said integral portion providing means to observe the relationship of said pin with respect to said hollow supporting member to quickly determine whether or not said pin is in operative fifth wheel engaging position relative to said tongue.

4. In a hitch structure of the character set forth and defined in claim 1, but which structure includes resilient means carried by said tongue and arranged to coact with said pin to permit relative movement between said pin and support under certain conditions of operation, said resilient means being movably mounted for actuation out of operative relation with respect to said pin.

5. In the combination of the character set forth and defined in claim 3, the inclusion of a resilient means arranged for engagement with said pin and adapted to normally urge the pin in a direction to hold said coacting pin positioning means in operative contact with respect to each other and to thereby releasably maintain said pin in its operative nested and hitching relation within said hollow support.

References Cited in the file of this patent

UNITED STATES PATENTS

| | | |
|---|---|---|
| 1,591,857 | Mayer | July 6, 1926 |
| 1,953,705 | Fellows | Apr. 3, 1934 |
| 1,977,013 | Robb | Oct. 16, 1934 |
| 1,992,164 | Arner | Feb. 26, 1935 |
| 2,318,038 | Winn | May 4, 1943 |
| 2,441,710 | Martin | May 18, 1948 |
| 2,494,799 | Duvall et al. | Jan. 17, 1950 |
| 2,568,283 | Harpster | Sept. 18, 1951 |